United States Patent
Chordia et al.

(10) Patent No.: US 8,468,845 B2
(45) Date of Patent: Jun. 25, 2013

(54) GEOTHERMAL ENERGY SYSTEM

(75) Inventors: Lalit Chordia, Pittsburgh, PA (US);
John C. Davis, Pittsburgh, PA (US)

(73) Assignee: Thar Geothermal, Inc., Pittsburgh, PA (US)

( * ) Notice: Subject to any disclaimer, the term of this patent is extended or adjusted under 35 U.S.C. 154(b) by 626 days.

(21) Appl. No.: 12/752,824

(22) Filed: Apr. 1, 2010

(65) Prior Publication Data
US 2010/0252229 A1 Oct. 7, 2010

Related U.S. Application Data

(60) Provisional application No. 61/211,716, filed on Apr. 1, 2009.

(51) Int. Cl.
*F25D 23/12* (2006.01)

(52) U.S. Cl.
USPC .......................................................... 62/260

(58) Field of Classification Search
USPC ........ 62/260, 324.1, 324.6, 498, 602; 165/45, 165/104.22
See application file for complete search history.

(56) References Cited

U.S. PATENT DOCUMENTS

| | | | |
|---|---|---|---|
| 4,325,228 A * | 4/1982 | Wolf | 62/260 |
| 4,896,716 A | 1/1990 | Sotani et al. | |
| 5,025,634 A * | 6/1991 | Dressler | 62/79 |
| 5,939,665 A * | 8/1999 | Banyopadhyay | 114/20.1 |
| 5,966,954 A | 10/1999 | Arima et al. | |
| 6,591,618 B1 | 7/2003 | Howard et al. | |
| 6,668,554 B1 | 12/2003 | Brown | |
| 6,772,605 B2 | 8/2004 | Xu | |
| 7,334,415 B2 | 2/2008 | Krabbendam et al. | |
| 2007/0266722 A1 | 11/2007 | McCaughan | |
| 2007/0295477 A1 | 12/2007 | Mueller et al. | |
| 2008/0053130 A1 | 3/2008 | Mueller et al. | |
| 2009/0000318 A1 | 1/2009 | Hart | |

FOREIGN PATENT DOCUMENTS

| | | |
|---|---|---|
| DE | 20 2004 016998 U1 | 2/2005 |
| EP | 1 143 778 A1 | 10/2001 |
| FR | 2 785 667 A1 | 5/2000 |
| WO | WO 92/19851 A2 | 11/1992 |

OTHER PUBLICATIONS

Zhang, X.R. et al., Study of solar energy powered transcritical cycle using supercritical carbon dioxide, Int. J. Energy Res. 2006; 30:1117-1129.

Langniβ, O., et al, Renewables for Heating and Cooling—Untapped Potential, Int. Energy Agency, Nov. 2007, pp. 1-205, IEA Publications, Paris, FR.

(Continued)

*Primary Examiner* — Melvin Jones
(74) *Attorney, Agent, or Firm* — David G. Oberdick; Peter J. Borghetti

(57) ABSTRACT

A geothermal energy system with reverse thermodynamic flow scheme that employs a pump or a compressor in series with a ground heat rejection or a ground heat absorber. The pumped geothermal energy system evaporates and condenses the working fluid at substantially the same pressure in the ground loop. The working fluid could be carbon dioxide, Freon, water or any other suitable refrigerant. The compressive geothermal system condenses the working from a vapor to a liquid above, below, and substantially equal to critical pressure using carbon dioxide as the working fluid.

27 Claims, 11 Drawing Sheets

OTHER PUBLICATIONS

Walkinshaw, A., The Application of Carbon Dioxide in a Building Services Environment, Science et Technique Du Froid—Refrig Sci & Tech., Paris, FR, Aug. 29, 2004, XP000962554.

International Search Report and Written Opinion for Int'l Application PCT/US2010/000974, Dec. 22, 2010.

* cited by examiner

GEOTHERMAL ENERGY SYSTEM

CROSS REFERENCE TO RELATED APPLICATIONS

The present invention claims benefit of U.S. Provisional Application Ser. No. 61/211,716, entitled "PUMPED COOLING SYSTEM WITH GEOTHERMAL HEAT REJECTION" filed on Apr. 1, 2009, which is incorporated herein by reference.

FIELD OF THE INVENTION

The present invention is related generally to the field of Geothermal heating and cooling.

BACKGROUND OF THE INVENTION

The efficiency of a cooling or heating system can be described by the Coefficient of Performance, which is the ratio of the change in heat compared to the amount of supplied work. A conventional household air conditioner has a coefficient of performance typically in the range of 1.0 to 3.0. A conventional household furnace has a coefficient of performance close to 1.0, while systems utilizing conventional geothermal technology are typically in the range of 3.5 to 5.0.

Geothermal heating and cooling systems transfer the warmth or cold from the ground below to the home or building above. The earth is a natural heat source or sink, with year-round temperatures of fifty-five to seventy degrees Fahrenheit just below the surface. When the system is in cooling mode, the earth (heat sink) absorbs the heat of the working fluid, and when the system is in heating mode the working fluid absorbs the heat of the earth (heat source).

SUMMARY OF THE INVENTION

According to the invention, there is provided a geothermal energy system as defined in claims 1-20.

One embodiment of the present invention utilizes a reverse thermodynamic flow scheme for cooling adapted to direct and indirect geothermal energy systems that pumps the working fluid around the closed-loop circuit. A compressor is not necessary in a cooling scheme since the evaporation/condensation thermodynamic cycle operates at substantially the same pressure. The reverse thermodynamic flow produces a coefficient of performance of at least 7.5 and can be significantly higher depending on the system's components and orientation, the size of the desired space to be cooled, and the desired cooling temperature to be achieved in the space. Therefore, the present invention can be a cooling system that operates with a higher coefficient of performance while still effectively and efficiently providing cooling or heating.

The thermodynamic cycle of the present invention allows pumping of the working fluid in a substantially liquid state after the working fluid in a substantially liquid-vapor state has rejected heat into the ground via a ground loop. Pumping increases pressure to the level only required to overcome dynamic frictional loses in the closed loop circuit and static pressure differences caused by gravitational effects inside the ground loop without a substantial increase in either density or temperature of the working fluid. The amount of energy required to pump liquid is typically within 30 psi of the condensation pressure, which is much less than the amount of energy needed to compress a gas. Furthermore, because condensation takes place at a constant temperature of vapor-liquid equilibrium within the ground loop, the temperature difference between the working fluid and the ground remains steady throughout the loop, thereby ensuring efficient heat transfer to the ground. In terms of the typical measure of cooling efficiency—Coefficient of Performance (the quotient of heat exhausted over pumping or compression energy spent)—efficiency is 10 to 50 times higher for a pumped cycle as compared to conventional vapor compression.

Another embodiment of the present invention employs supercritical heat rejection thermodynamic cycle for compressive heating and cooling.

For a better understanding of the present invention, together with other and further objects thereof, reference is made to the accompanying drawings and detailed description.

BRIEF DESCRIPTION OF THE DRAWINGS

The present invention is illustratively shown and described in reference to the accompanying drawings, in which.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The term "geothermal" means the use of the ground as a body of predictably steady temperature that is not affected by the subterranean mantle of magma, volcanic activity or geyser-like formations. Heat is absorbed by or rejected to the earth at nearly constant temperature throughout the length of the ground loop being employed.

The term "latent heat" means the enthalpy content of condensed fluid vapor or of evaporated liquid.

The term "dew point" means a temperature that occurs when atmospheric humidity reaches 100% and the fluid can hold no more moisture. In the psychometric charts of this disclosure, the dew point is also the point at which liquid just begins to form in equilibrium with vapor at constant temperature and pressure.

The term "saturation temperature" means the temperature for a corresponding saturation pressure at which a liquid boils into its vapor phase.

The term "pumping" means the movement of fluids being substantially liquid, but can be a vapor-liquid mixture.

Direct heat exchange is defined as allowing for the medium to be heated or cooled by coming into direct contact or intermixing with the working fluid.

Indirect heat exchange is defined as the bringing of fluids into a heat exchange relation without physical contact or intermixing of the fluids with each other.

Embodiments of the present invention include direct and indirect heating and cooling with the reverse thermal dynamic cycle can be adapted to pump and compressor systems with single or multiple zones.

Figure 1:
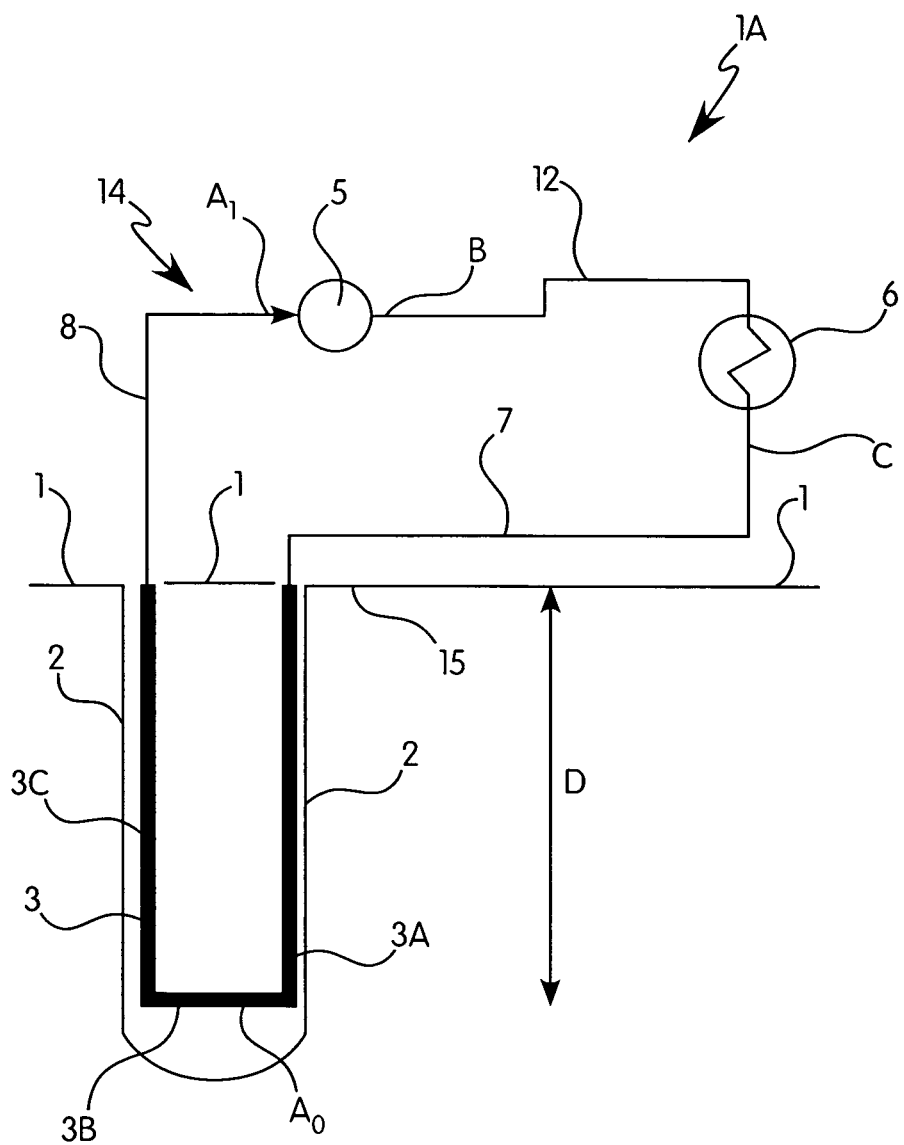
FIG. 1 illustrates one embodiment of the present invention being a direct geothermal energy system 1A that utilizes pumping to move a fluid through a continuous closed loop conduit.
Figure 2:
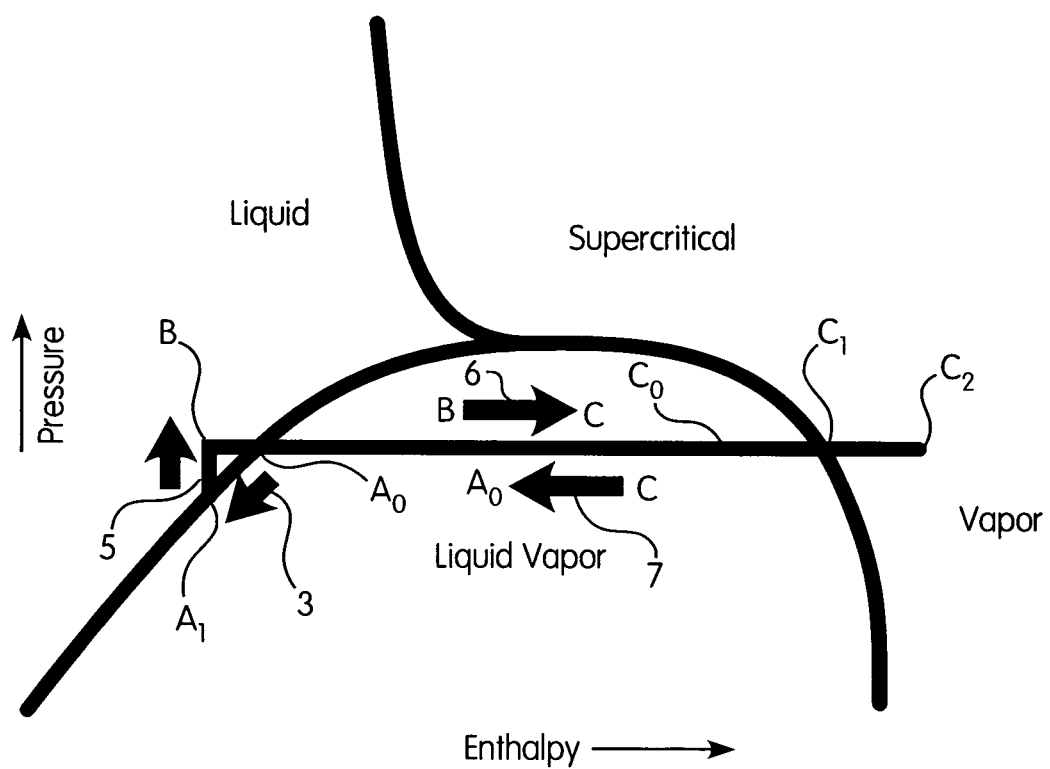
FIG. 2 is a psychrometric chart of the direct geothermal energy system 1A of FIG. 1.

FIG. 1 illustrates one embodiment of the present invention being a direct geothermal energy system 1A that utilizes pumping to transport a working fluid through a continuous closed-loop conduit 14, discussed in detail below. FIG. 2 is a psychrometric chart of the direct geothermal energy system 1A of FIG. 1. The evaporation and condensation of the working fluid occurs substantially at the same pressure. In particular, partial to complete condensation can occur between the exit C of the evaporator 6 and within the ground loop. One embodiment of the present invention condensates the working fluid only in the downward portion 3A in ground loop 3. Another embodiment of the present invention condensates the working fluid in downward portion 3A up to bottom 3B. And yet another embodiment of the present invention condensates the working fluid in downward portion 3A, bottom 3B, and upward portion 3C of ground loop 3. Bottom 3B can be formed as a general U-shaped tube or can be bent to any angle depending on the drilling angle of entry into the ground. One embodiment of the present invention substantially condensates the liquid-vapor working fluid along isopressure path below ground 1. Working fluid in the downward portion 3A of ground loop 3 to a substantially liquid state at bottom 3B of ground loop 3, such that substantially liquid working fluid that travels in the upward portion 3C of ground loop 3 is substantially liquid. In one embodiment of the present invention the condensation process can continue as the working fluid is drawn up upward portion 3C. Whereas, another embodiment of the present invention can only condensate the working fluid as it travels down downward portion 3A. Pump 5 supplies a suction upstream that draws working fluid from ground loop 3 to the entrance of pump 5. As working fluid is drawn towards pump 5, it travels down the saturation line of the thermodynamic cycle (FIG. 2, $A_0 \rightarrow A_1$) as the pressure in working fluid decreases due to system loses to produce a working fluid with a lower pressure at the entrance $A_1$ to pump 5. Liquid working fluid at $A_1$ is pumped through pumper 5, thereby increasing the working fluid pressure to produce liquid working fluid at B with higher pressure. Liquid working fluid at B is circulated to evaporator 6 to begin the thermodynamic process again. This embodiment does not require a compressor to move the fluid through the closed loop circuit.

Figure 10:
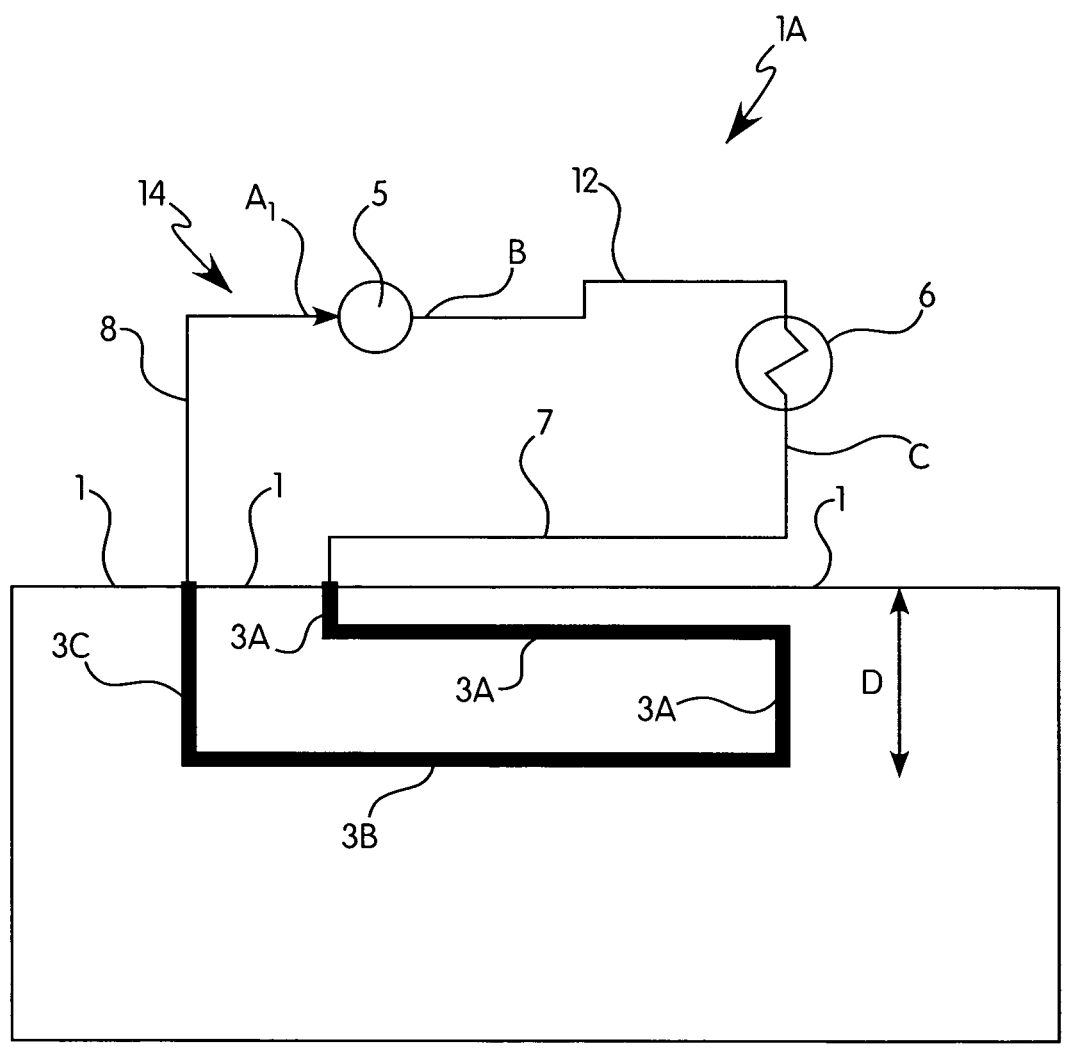
FIG. 10 illustrates a horizontal geothermal energy system.
Figure 11:
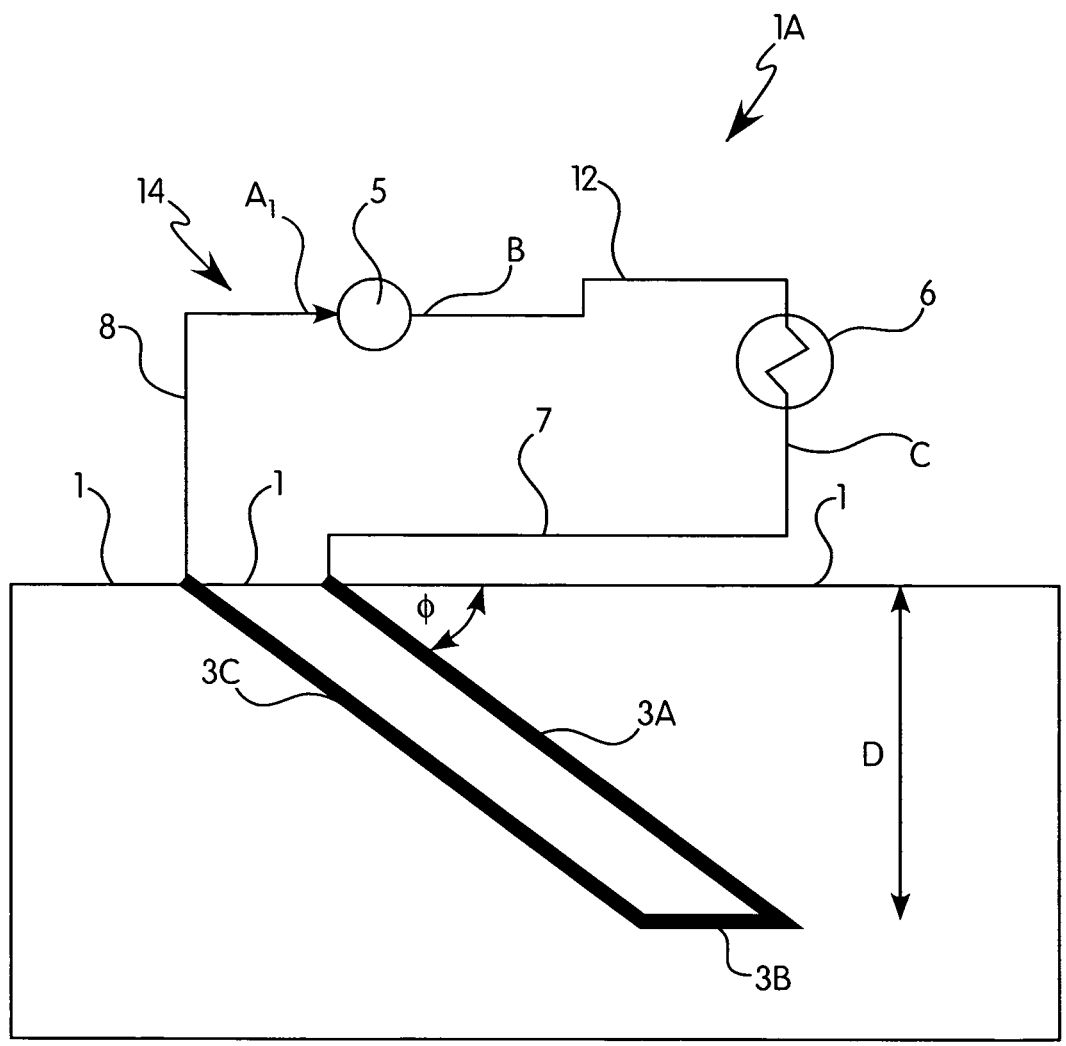
FIG. 11 illustrates a geothermal energy system having a hole drilled at any angle.

An example of system 1A includes the following components being connected in series to form continuous closed loop conduit 14: ground loop conduit 3, direct feed conduit 8, pump 5, intermediate conduit 12, heat absorber 6, and direct return conduit 7 back to ground loop conduit 3 being Depth D from ground surface 15. Depth D can be a few feet to hundreds of feet depending on the thermodynamic capacity of the system. Hole 2 can be drilled vertically or at any entry angle Ø (FIG. 11), for example 30° to 45°, and backfilled in accordance with standard practices. Some embodiments can be primarily horizontal with a flat bottom 3B (FIG. 10) starting just below the frost line. Again, FIG. 1 illustrates the working fluid entering ground loop 3 at as a liquid-vapor fluid and condenses in the downward portion 3A of ground loop 3 to a substantially liquid working fluid ($A_0$) at the bottom 3B of ground loop 3. Working fluid being substantially liquid emerges from the ground loop conduit 3 and is drawn through direct feed conduit 8 to pump 5 by the pump suction of pump 5. Working fluid at B being substantially liquid exits pump 5 at a higher pressure than working fluid at $A_1$ but at substantially the same enthalpy. The increased pressure is required to overcome head losses that occurred in forcing condensed working fluid $A_0$ out of ground loop 3 and any frictional losses within the entirety of the cycle. Working fluid at B is moved from pump 5 through intermediate conduit 12 to heat absorber 6. Working fluid enters the evaporative heat absorber 6, where it changes state in part from liquid to vapor at substantially the same pressure as illustrated in FIG. 2 by the right arrow from Point B to Point C. In the process working fluid accepts heat from the media being cooled in evaporative heat absorber 6 and is transformed into vapor. At the outlet C of the evaporative heat absorber 6, working fluid may be either a mixture of liquid and vapor (denoted by Point $C_0$ in FIG. 2), or a vapor at its dew point (denoted by Point $C_1$ in FIG. 2), or a superheated gas or vapor (denoted by Point $C_2$ in FIG. 2), depending on the amount of heat absorbed in evaporative heat absorber 6. At this point, working fluid returns to ground loop 3 without substantial change in pressure, where it begins condensing in part along the same thermodynamic cycle path, but in the opposite direction as illustrated in FIG. 2 by the left arrow from Point C to Point $A_0$. Liquid-vapor working fluid is drawn back through ground loop 3 to transform working fluid via condensation to a substantially liquid working fluid at the bottom 3B of ground loop 3 where the cycle repeats. Ground loop 3 acts as an underground heat rejection loop being completely passive and hidden from view and eliminating the need for outdoor, window-mounted or roof-top air-blown heat rejecter, along with the electrically powered fans required to run it. The below flow path diagram illustrates the fluid circuit and phase changes of the work fluid The present invention pumping of the working fluid also enables the partitioning of the cool liquid into separate streams at flow rates that are independent of each other. Embodiments of the present invention include direct (FIG. 3) and indirect pumped systems (FIG. 4). Each system can be outfitted with independent distributed branches as illustrated by conduits 13a, 13b, 13c. Each stream can have its own pump 5a, 5b, 5c, which turns on or off, or varies in speed, according to the needs of the particular zone inside a building being served by this partition. Alternatively, the plurality of pumps can be replaced with valves and a single pump downstream of accumulator 5 and upstream of the valves (not shown). This method of distributing cooling is more efficient and flexible than conventional central air systems since air ducts are not required with the present invention. Due to the flexibility of the present invention, the present invention pumped systems are ideally suited for air-conditioning retrofits in existing buildings.

Figure 3:
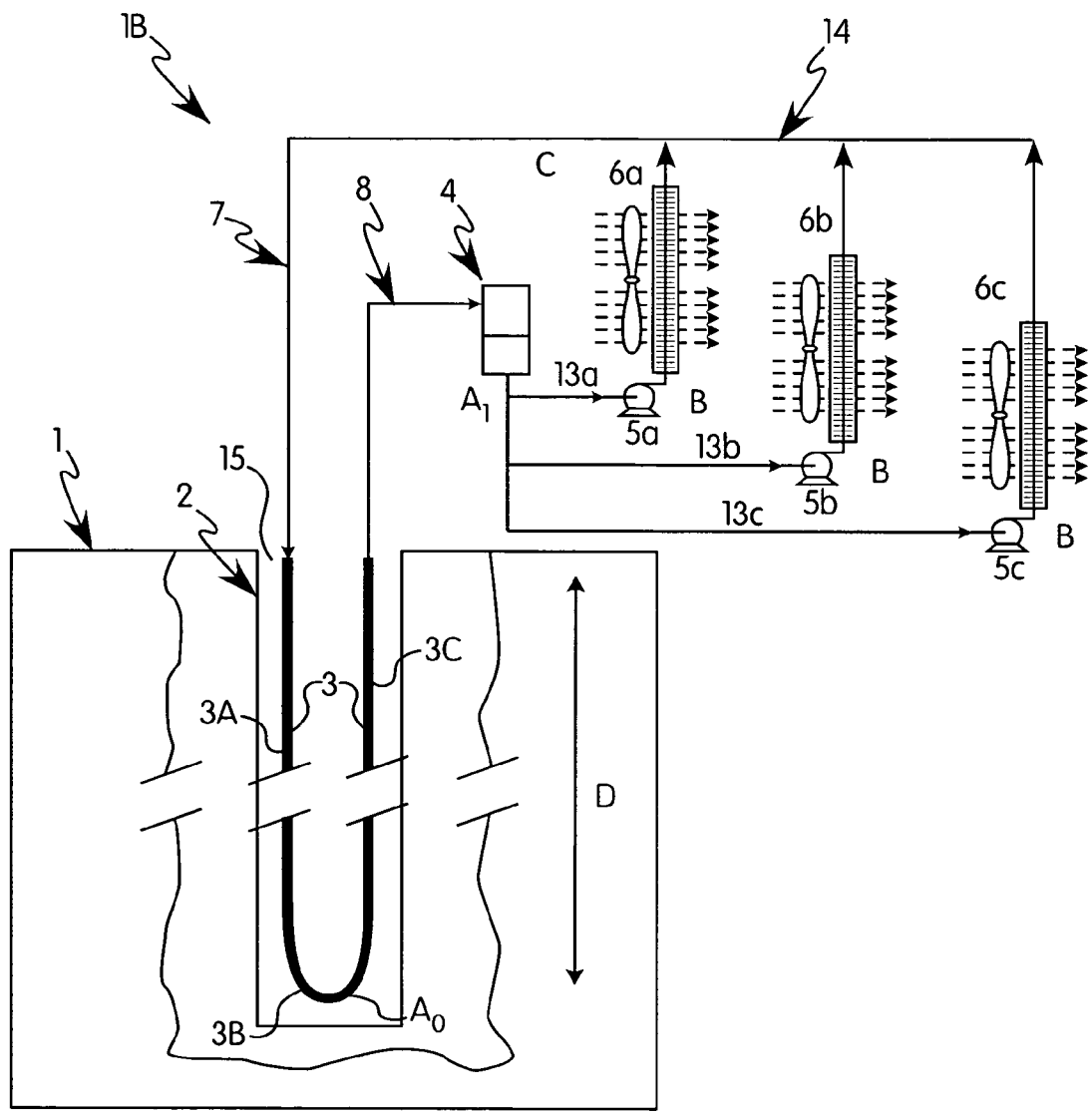
FIG. 3 illustrates a direct Geothermal energy system embodiment 1B of the present invention having a plurality of pumps and evaporators.
Figure 4:
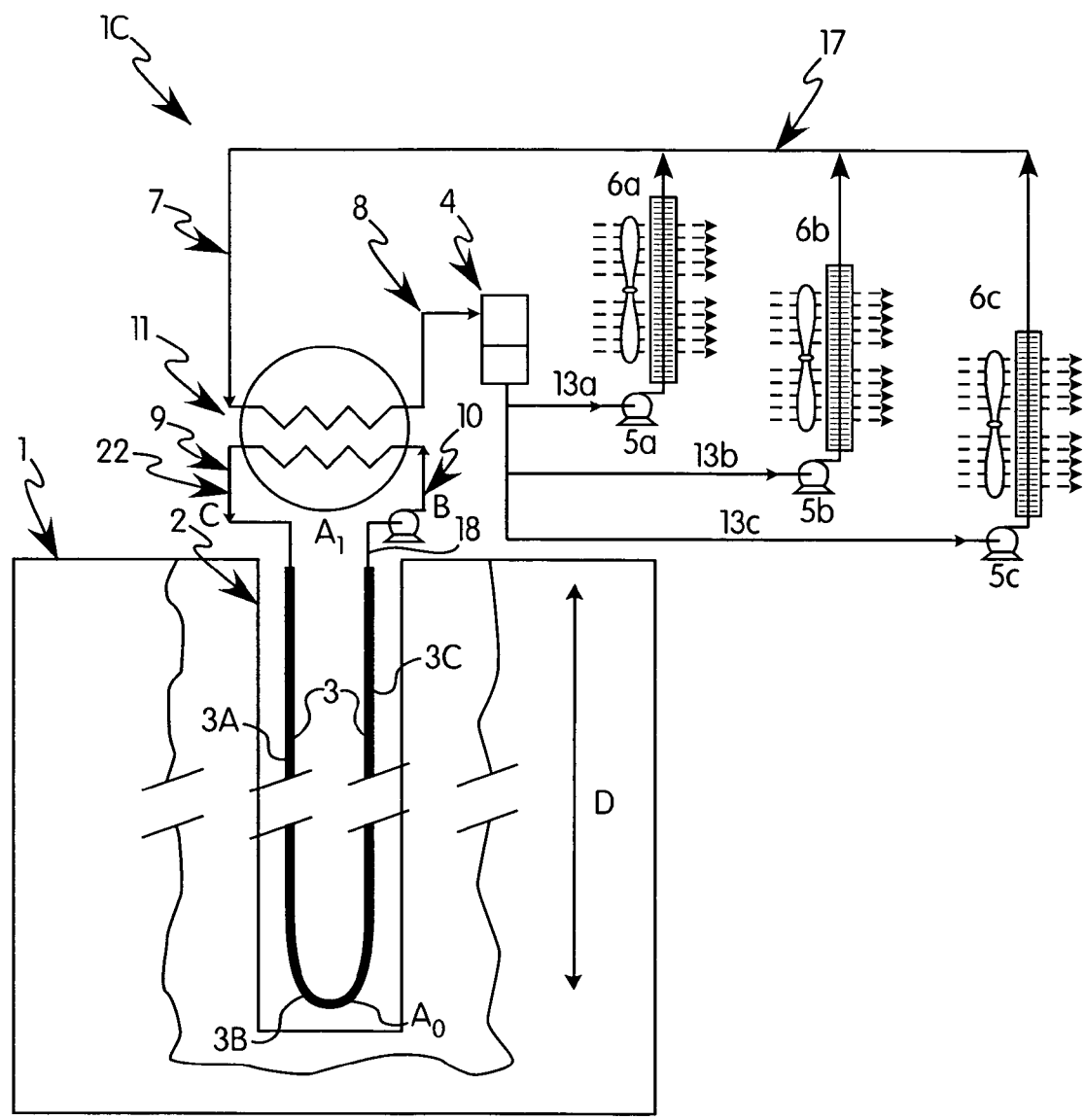
FIG. 4 illustrates an indirect Geothermal energy system embodiment 1C of the present invention.

An embodiment of the direct-exchange system 1B of the present invention is shown in FIG. 3 with a thermodynamic cycle as shown in FIG. 2. Hole 2 is drilled into ground 1 that contains ground loop conduit 3 of continuous conduit 14. Ground loop conduit 3 is a heat exchanger rejecting heat to ground 1 during the cooling cycle and absorbing heat during the heating cycle (FIG. 2, C→$A_0$). Return feed conduit 7 connects with ground loop conduit 3 at ground surface 15 to move working fluid from C to ground loop 3, which extends down to depth D and turning 180-degrees back toward ground surface 15 forming a U-shaped tubing. Direct feed conduit 8 transports the working fluid exiting from ground loop conduit 3 to accumulator 4 without pressure or temperature change. Accumulator 4 can be placed at ground surface 15 or just below it and can be positioned upstream of the suction of pumps 5a, 5b, 5c so to ensure the flow of liquid or at least minimally compressible fluid at $A_1$ to the pumps 5a, 5b, 5c through independent flow conduits 13a, 13b, 13c, respectively. Ground loop conduit 3 is made of material sufficient to withstand the pressure of the working fluid and to avoid corrosion due to contact with the soil. For example, stainless steel tubing is typically employed in the case of direct-exchange ground loops. From pumps 5a, 5b, 5c, working fluid at B evaporates in heat absorbers 6a, 6b, 6c, respectively, to produce working fluid at C before returning to the ground loop conduit 3 via direct return conduit 7 to the liquid work fluid. The number of distributed heat absorbers 6 are not limited to the embodiments illustrated in this application. The number of distributed heat absorbers 6 is determined by the thermodynamic needs of the system. Three such heat absorbers are shown in FIG. 3 for illustrative purposes only.

Now turning to FIG. 4 that illustrates an indirect heat transfer embodiment 1C of the present invention with a second working fluid circulating in a continuous closed loop ground conduit 22. The working fluid can be Freon, carbon dioxide, water, or any refrigerant in any combination. Indirect heat transfer embodiment 1C includes an above ground pumped first working fluid, for example carbon dioxide, circulating in an above ground continuous conduit 17 that exhausts heat to a second pumped working fluid, for example water, in heat exchanger 11. The first working fluid condenses in heat exchanger 11 before being pumped back to above ground heat absorbers 6a, 6b, 6c in the same manner as the direct heat transfer embodiment of FIG. 1. The second working fluid re-circulates through the ground loop 3 where the heat absorbed by the second working fluid from the first working fluid is exhausted from the second working fluid to the ground 1 based on the thermodynamic cycle of FIG. 2. Cool second working fluid emerging from ground loop 3 via ground exit conduit 18 is driven by separate pump 19 into heat exchanger 11 via heat exchanger feed conduit 10 to absorb heat from the evaporated first working fluid, which causes the first working fluid to condense. The warmed second fluid returns to the ground loop via heat exchanger return conduit 9. The second working fluid re-circulates in heat exchanger continuous closed loop conduit 22 at moderate pressures that allows ground loop 3 to be made of plastic or other light weight/low strength materials.

Hole 2 used for the ground loop is typical of underground heat-pump systems. The depth D of the hole 2 is determined by the heat transfer properties of the working fluid, the amount of heat to be dissipated and the properties of the earth in which the hole is placed. A single hole or a plurality of holes may be used. As discussed above, the hole(s) can be vertical, horizontal, or angled in orientation to ground level. If the orientation is vertical and a plurality of holes is needed, the distance between the holes also is determined by the heat transfer properties of the working fluid, the amount of heat to be dissipated and the properties of the earth in which the holes are placed. Further, if a plurality of vertical holes is used, a manifolding system is used to connect to the piping in the plurality of vertical holes. If the orientation is horizontal, a serpentine array of tubing snaking just a few feet below the ground surface is preferably used.

Figure 5:
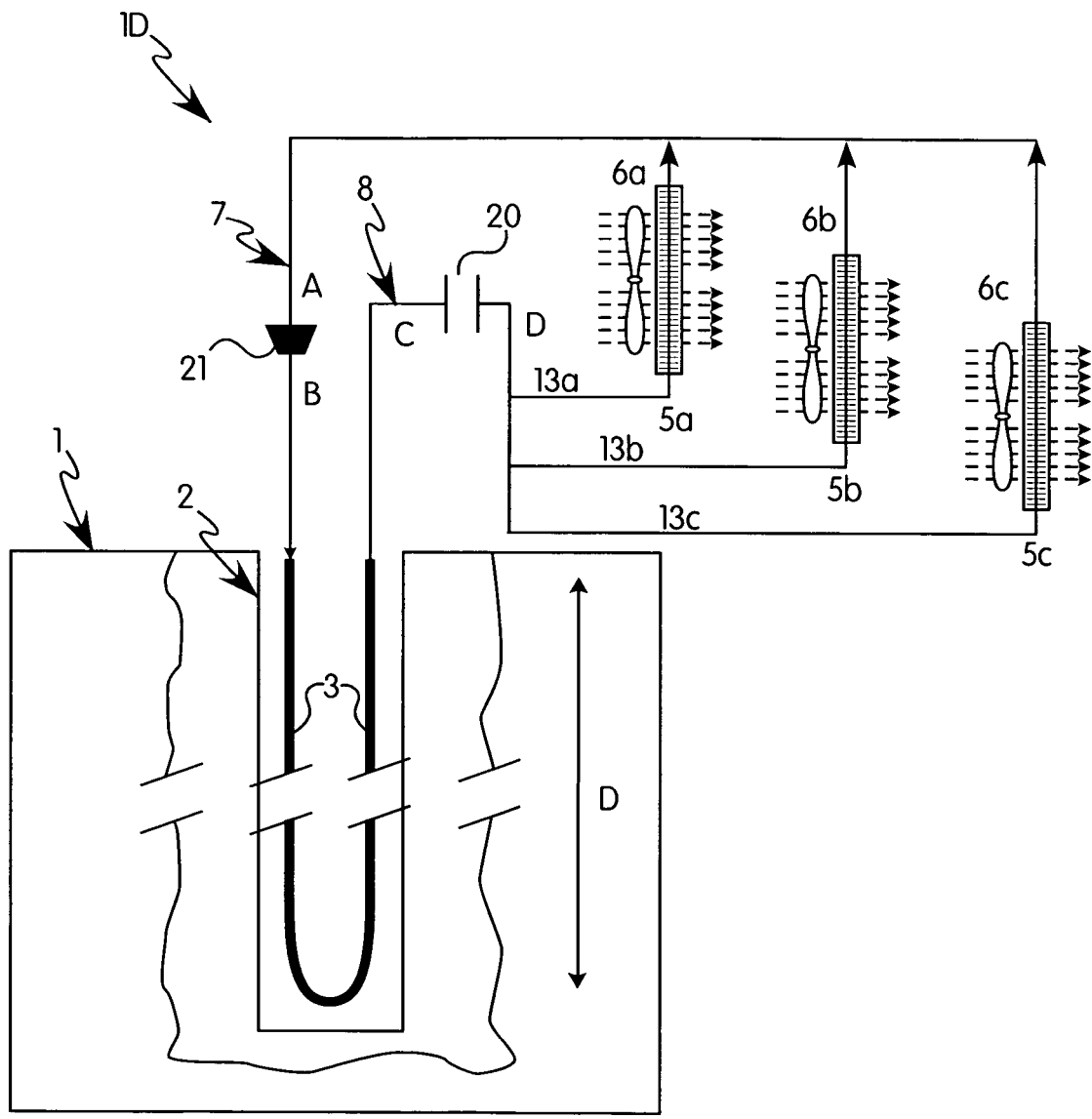
FIG. 5 illustrates a direct compressive heating Geothermal energy system embodiment 1D of the present invention having an expander upstream of a plurality of evaporators and a compressor downstream of the evaporators.
Figure 6:
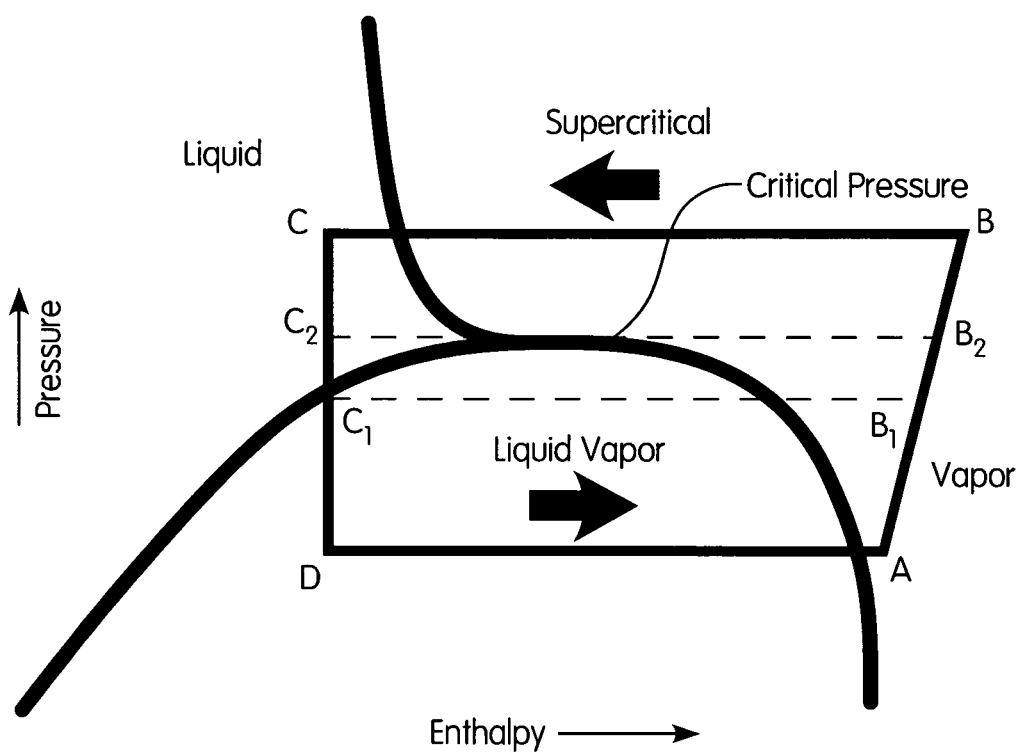
FIG. 6 illustrates a psychrometric representation of a Geothermal energy system that utilizes a compressor for the heating and cooling cycle.
Figure 7:
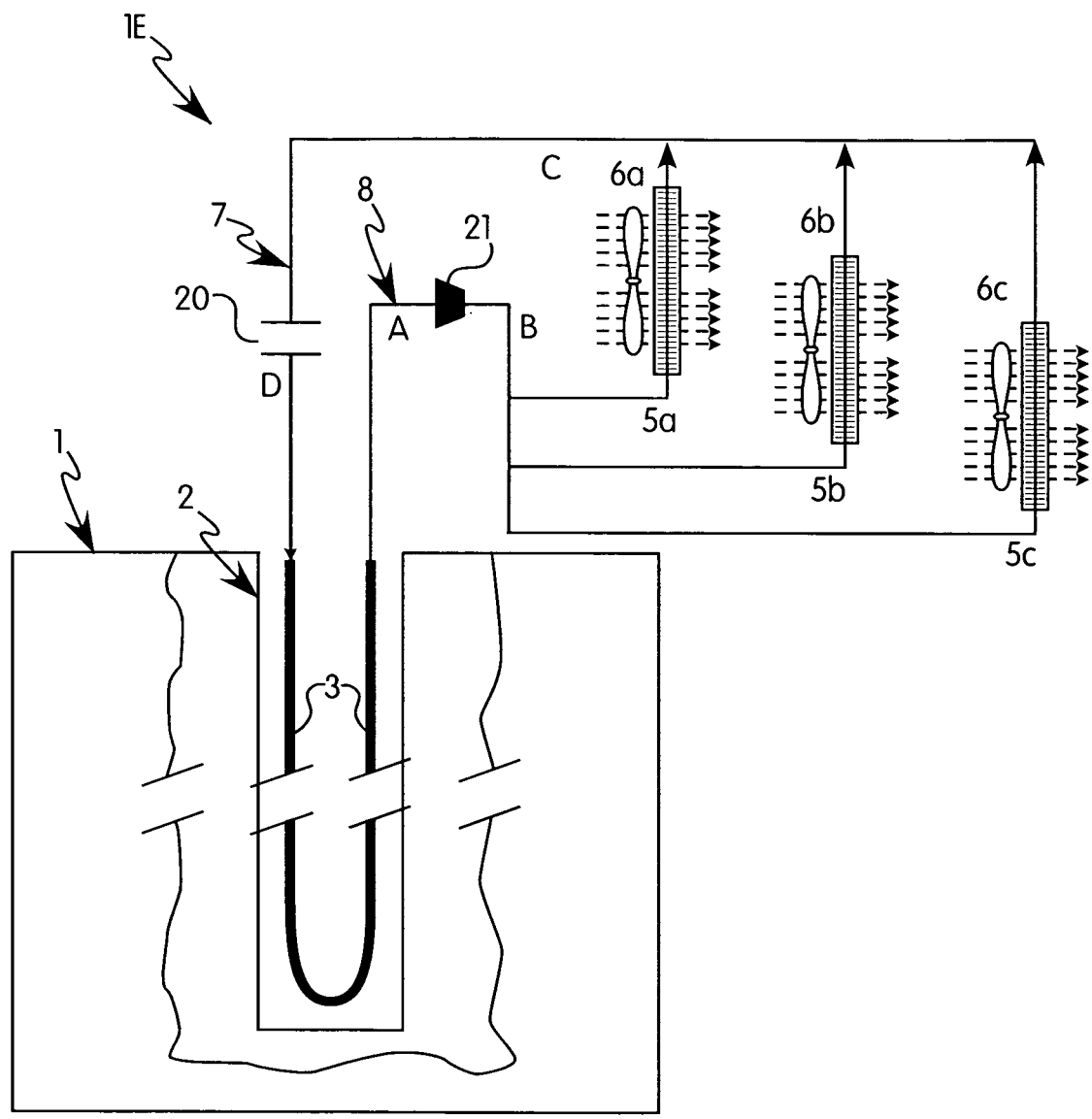
FIG. 7 illustrates a direct compressive cooling Geothermal energy system embodiment 1E of the present invention having a compressor upstream of a plurality of evaporators and an expander downstream of the evaporators.

Another embodiment of the present invention replaces the pump with a compressor that enables heating as well as cooling, illustrated in FIGS. 5 and 7. For example, a compressive carbon dioxide $CO_2$ cycle is shown in FIG. 6. In both cooling and heating, working fluid heat rejection occurs along the same line, B→C, and working fluid heat absorption occurs along the same line (D→A). In one embodiment of the present invention the heat rejection only occurs above the critical pressure of $CO_2$ for purposes of maintaining an adequate temperature differential between the working fluid and the media with which it is exchanging heat. In another embodiment of the present invention, heat rejection only occurs below the critical pressure as shown in FIG. 6, $B_1$→$C_1$. In yet another embodiment of the present invention heat rejection can occur in either above or below the critical pressure depending on the operational specifications of the system, such as a geothermal energy system. In yet one more embodiment of the present invention heat rejection can occur at a pressure about equal to the critical pressure $B_2$→$C_2$.

One embodiment of the present invention performs compressive cooling as illustrated in FIG. 5, where ground 1 becomes the heat sink. The working fluid goes through various degrees of phase changes (A-D) from liquid to vapor as the working fluid is circulated through the direct exchange system as illustrated in the psychrometric chart in FIG. 6. Dense supercritical working fluid at C has exited ground loop 3 and passes through expander 20 to release pressure, whereupon it condenses to a liquid or, as shown in FIG. 6, a mixed vapor-liquid working fluid at D. Working fluid at D enters heat absorbers 6a, 6b 6c via conduit 22a, 22b, 22c and heat from the media being cooled in heat absorbers 6a, 6b 6c is absorbed by working fluid to be transformed into gaseous working fluid at the exit of heat absorbers 6a, 6b 6c. Gaseous working fluid at A is compressed by compressor 21 to a higher pressure and temperature to be transformed into supercritical working fluid at B (exit of the compressor). After which supercritical working fluid at B enters ground loop 3 for heat rejection into ground 1 between points B and C at the same pressure to which it was compressed, where the thermodynamic cycle repeats. The thermodynamic process from B→C directly transforms the supercritical working fluid to a denser condition without a phase change for a transcritical cycle. However, some embodiments of the present invention are not transcritical cycles.

Another embodiment of the present invention performs compressive heating illustrated in FIG. 7, where ground 1 becomes the heat absorber as the path for heat rejection by the working fluid being opposite of the case in compressive cooling in FIG. 5. The psychrometric chart of FIG. 6 is directionally the same, although liquid working fluid at C must be expanded by expander 20 to liquid-vapor working fluid at D with a pressure low enough that its saturation temperature for vapor-liquid equilibrium is sufficiently below ground temperature such that it will absorb energy from the ground and evaporate to vapor working fluid A. Liquid-vapor working fluid at D absorbs heat as it circulates through ground loop 3 by evaporative cooling to produce vapor working fluid at A. Vapor working fluid at A is compressed by compressor 21 to produce supercritical working fluid at B with a pressure and temperature sufficient to provide heat to the media being heated in heat exchangers 6a, 6b, 6c in a distributed system. Heat exchanges 6a, 6b, 6c reduce the temperature and enthalpy of supercritical working fluid between points B and C. Working fluid at C returns to expander 20 where it condenses to liquid and the closed loop compressive heating cycle repeats. Because the roles of the ground and media heat exchangers are reversed from the case of cooling, the locations of the compressor and expander are also reversed, as shown in FIGS. 5 and 7.

Figure 8:
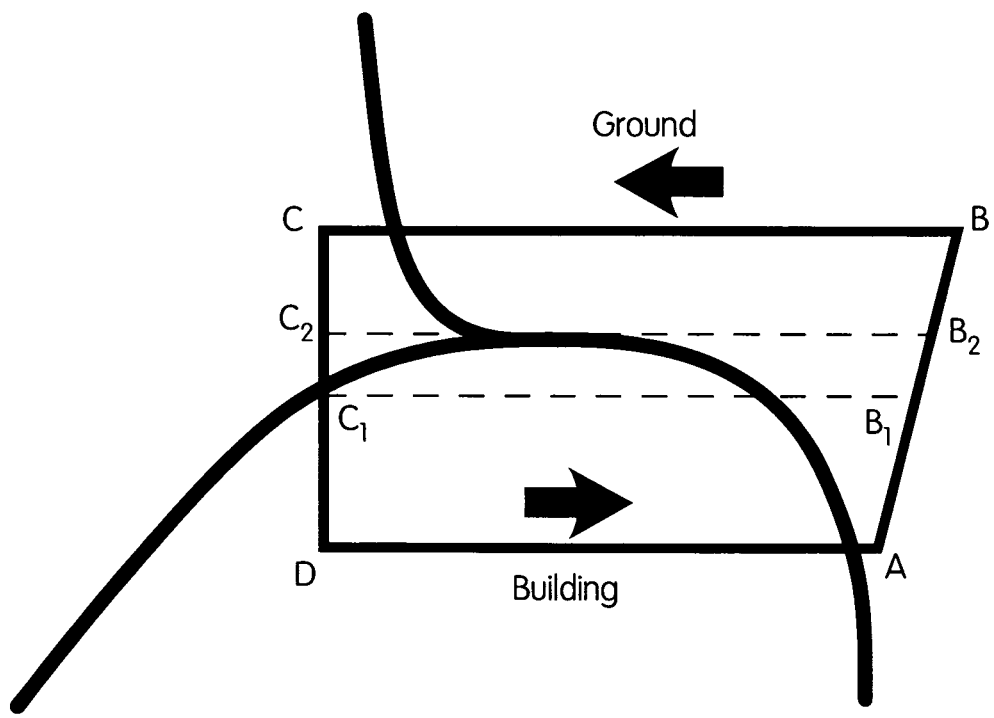
FIG. 8 illustrates a psychrometric representation of a compressive cooling cycle of the Geothermal energy system of FIG. 5.
Figure 9:
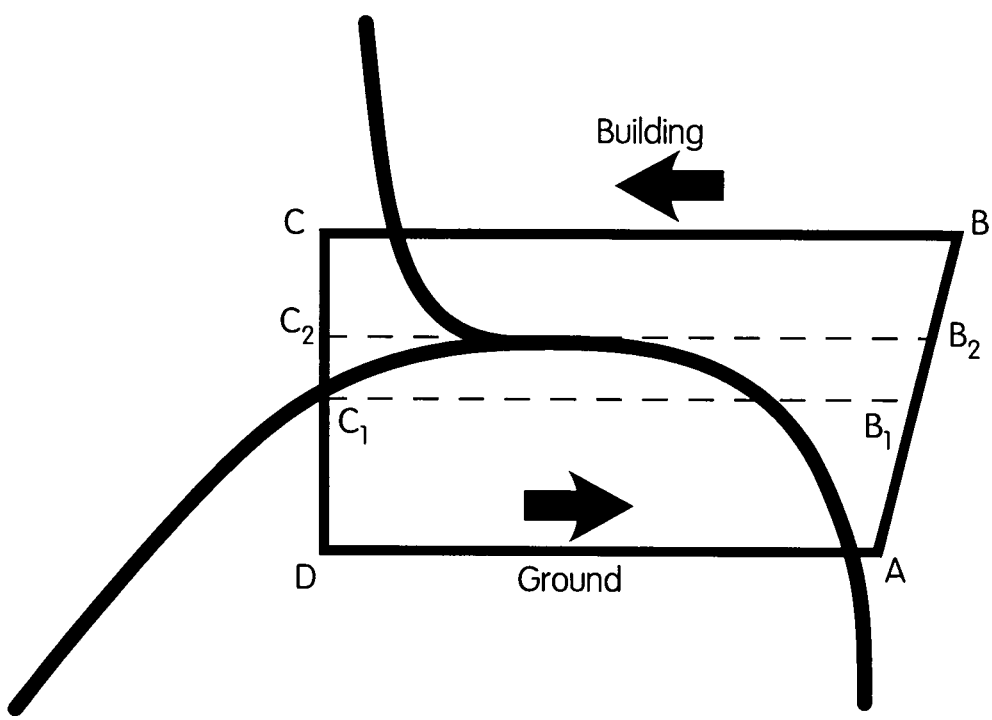
FIG. 9 illustrates a psychrometric representation of a compressive heating cycle of the geothermal energy system of FIG. 7.

FIGS. 8 and 9 illustrate graphically the compressive cooling and heating cycles with regards to heat sinks (B→C) and heat sources (D→A). FIG. 8 is a compressive cooling thermodynamic cycle where the ground absorbs heat (B→C) from the working fluid that was absorbed from a building (D→A). FIG. 9 is a compressive heating thermodynamic cycle where a building absorbs heat (B→C) from the working fluid that was picked up from the ground (D→A). Some embodiments of the present invention B→C is below the critical pressure Although the present invention illustrates carbon dioxide fluid as the pumped working fluid, the present invention is not limited to any refrigerant. However, carbon dioxide has advantages with regards to temperature-pressure characteristics, low costs compared to other refrigerants, and being environmentally benign. Carbon dioxide can be employed to directly absorb heat from the ground for heating cycle and directly reject heat to the ground for cooling cycle without the need for an intermediate fluid. Condensed carbon dioxide emerging from the ground loop can be pumped directly to a compact air-blown coil within a building, evaporating within that coil before returning to the ground loop.

The embodiment of the present invention that utilizes carbon dioxide as the working fluid for ground-loop heat rejection has a vapor-liquid equilibrium temperature between 59 and 68 F, which is within the typical underground temperature of 55 F and a typical room temperature of 72 F, between 760 psia and 830 psia. At these conditions, the temperature difference between the fluid's saturation temperature and that of the surroundings is enough to either absorb heat through evaporation above ground or exhaust heat through condensation below ground. For a pumping cycle, the delta temperature can be about 3° F. to about 15° F. about the ground temperature. For a compressive cycle, the delta temperature can be greater than about 15° F. A consequence of this thermodynamic condition is that working fluid can be pumped after the heat has been rejected, for example, into the ground. The required pressure increase during pumping is that which is sufficient to overcome dynamic frictional loses in the circuit and static pressure differences caused by gravitational effects inside the ground loop.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of closed loop cooling comprising the steps of:
providing a closed loop cooling system having a working fluid in a first substantially liquid state with a first working fluid pressure;
pumping the working fluid to increase the first working fluid pressure to a second working fluid pressure, wherein the second working fluid pressure is higher than the first working fluid pressure without a phase change;
evaporating the working fluid from the substantially liquid state to another fluid state at the second working fluid pressure, wherein the evaporation step occurs in a heat evaporator in a direct geothermal cooling system;
condensing the working fluid in the another fluid state to a second substantially liquid state at the second working fluid pressure; and
drawing the working fluid at the second substantially liquid state back to the pumping step, wherein the second working fluid pressure drops to the first working fluid pressure,
wherein the closed loop cooling method does not include a compression step.

2. The method according to claim 1 wherein the another fluid state of the evaporating step is a liquid-vapor state.

3. The method according to claim 1 wherein the another fluid state of the evaporating step is a vapor state.

4. The method according to claim 1 wherein the other fluid state of the evaporating step is a superheated vapor state.

5. The method according to claim 1 wherein the condensing step occurs in a ground loop of a geothermal energy system.

6. A method of closed loop cooling comprising the steps of:
providing a closed loop cooling system having a working fluid in a first substantially liquid state with a first working fluid pressure;
pumping the working fluid to increase the first working fluid pressure to a second working fluid pressure, wherein the second working fluid pressure is higher than the first working fluid pressure without a phase change;
evaporating the working fluid from the substantially liquid state to another fluid state at the second working fluid pressure, wherein the evaporation step occurs in a heat exchanger in an indirect geothermal cooling system;
condensing the working fluid in the another fluid state to a second substantially liquid state at the second working fluid pressure; and
drawing the working fluid at the second substantially liquid state back to the pumping step, wherein the second working fluid pressure drops to the first working fluid pressure,
wherein the closed loop cooling method does not include a compression step.

7. A method of closed loop cooling comprising the steps of:
providing a closed loop cooling system having carbon dioxide in a first substantially liquid state with a first working fluid pressure;
pumping the carbon dioxide to increase the first working fluid pressure to a second working fluid pressure, wherein the second working fluid pressure is higher than the first working fluid pressure without a phase change;
evaporating the carbon dioxide from the substantially liquid state to another fluid state at the second working fluid pressure;
condensing the carbon dioxide in the another fluid state to a second substantially liquid state at the second working fluid pressure; and
drawing the carbon dioxide at the second substantially liquid state back to the pumping step, wherein the second working fluid pressure drops to the first working fluid pressure,
wherein the closed loop cooling method does not include a compression step.

8. A method of compressing cooling comprising the steps of:
providing a closed loop cooling system having a working fluid in a substantially liquid state with a first working fluid pressure, wherein the working fluid is carbon dioxide;

expanding the working fluid from the first working fluid pressure to a second working fluid pressure being lower than the first working fluid pressure;

evaporating the working fluid at the second pressure after the expanding step, wherein the working fluid changes phase to a vapor;

compressing the working fluid to the first working fluid pressure after the evaporation step; and cooling the working fluid at the first pressure after the compressing step, wherein the working fluid decreases in enthalpy and increases in density in a supercritical state without an intermediary phase change to a liquid-vapor.

9. The method according to claim 8 wherein the cooling step further occurs in a ground loop of a geothermal cooling system.

10. The method according to claim 8 wherein the evaporation step occurs in a heat evaporator in a geothermal cooling system.

11. The method according to claim 8 wherein the first working fluid pressure over a critical pressure.

12. The method according to claim 8 wherein the first working fluid pressure below a critical pressure.

13. The method according to claim 8 wherein the first working fluid pressure about equal to a critical pressure.

14. A method of compressing heating comprising the steps of:

providing a closed loop heating system having a working fluid in a substantially liquid state with a first working fluid pressure, wherein the working fluid is carbon dioxide;

expanding the working fluid from the first working fluid pressure to a second working fluid pressure being lower than the first working fluid pressure;

evaporating the working fluid at the second pressure after the expanding step, wherein the working fluid changes phase to a vapor;

compressing the working fluid to the first working fluid pressure after the evaporation step; and cooling the working fluid at the first pressure after the compressing step, wherein the working fluid decreases in enthalpy and increases in density without an intermediary phase change to a liquid-vapor.

15. The method according to claim 14 wherein the condensing step occurs in a heat exchanger of a geothermal heating system.

16. The method according to claim 14 wherein the evaporation step occurs in a ground loop in a geothermal heating system.

17. The method according to claim 8 wherein the first working fluid pressure over a critical pressure.

18. The method according to claim 8 wherein the first working fluid pressure below a critical pressure.

19. The method according to claim 8 wherein the first working fluid pressure about equal to a critical pressure.

20. The method according to claim 6 wherein the another fluid state of the evaporating step is a liquid-vapor state.

21. The method according to claim 6 wherein the another fluid state of the evaporating step is a vapor state.

22. The method according to claim 6 wherein the other fluid state of the evaporating step is a superheated vapor state.

23. The method according to claim 6 wherein the condensing step occurs in a ground loop of a geothermal energy system.

24. The method according to claim 7 wherein the another fluid state of the evaporating step is a liquid-vapor state.

25. The method according to claim 7 wherein the another fluid state of the evaporating step is a vapor state.

26. The method according to claim 7 wherein the other fluid state of the evaporating step is a superheated vapor state.

27. The method according to claim 7 wherein the condensing step occurs in a ground loop of a geothermal energy system.

* * * * *